INVENTOR.
ROBERT W. SUTTON.
STEPHEN G. WOODWARD.
CURTIS A. HARTMAN.
BY
ATTORNEY

INVENTOR.
ROBERT W. SUTTON.
STEPHEN G. WOODWARD.
CURTIS A. HARTMAN.
BY James L. O'Brien
ATTORNEY April 18, 1961   R. W. SUTTON ET AL   2,980,090
FUEL INJECTION SYSTEM Filed Feb. 4, 1957   11 Sheets-Sheet 9

INVENTOR.
ROBERT W. SUTTON
STEPHEN G. WOODWARD
CURTIS A. HARTMAN
BY James L. O'Brien
ATTORNEY April 18, 1961 R. W. SUTTON ET AL 2,980,090
FUEL INJECTION SYSTEM
Filed Feb. 4, 1957 11 Sheets-Sheet 10

INVENTOR
ROBERT W. SUTTON
STEPHEN G. WOODWARD
CURTIS A. HARTMAN
BY James L. O'Brien
ATTORNEY

United States Patent Office 2,980,090
Patented Apr. 18, 1961

2,980,090

FUEL INJECTION SYSTEM

Robert Winfield Sutton, Stephen G. Woodward, and Curtis A. Hartman, Elmira, N.Y., assignors to The Bendix Corporation, a corporation of Delaware Filed Feb. 4, 1957, Ser. No. 637,852

39 Claims. (Cl. 123—119)

The present invention relates generally to a fuel system for a multi-cylinder internal combustion engine and more particularly to a supply system for supplying fuel in measured quantities to the individual cylinders of the engine or to the intake manifold adjacent each cylinder in timed relation to engine operation. This application is a continuation-in-part of our application Serial No. 567,688, filed February 24, 1956, and now abandoned.

It is an object of the present invention to provide a fuel supply system having a discharge nozzle for each cylinder and a single control device wherein fuel is supplied in controlled quantities to the engine in timed relation thereto.

It is a further object of the invention to provide an accurately controllable quick responding valve for each of the discharge nozzles of a fuel supply system.

Another object of the invention is to provide for a vehicle mounted engine a fuel supply system having an intake manifold of reduced height disposed to utilize the ram effect obtained from forward movement of the vehicle.

Still another object of the invention is to provide a fuel supply system having relatively few moving parts and which is relatively inexpensive to manufacture.

Another object of the invention is to provide in a fuel supply system means for enriching the fuel-air mixture ratio supplied to an engine during starting and warm-up operation.

Other objects and advantages will be readily apparent from the following detailed description taken in connection with the appended drawings in which.

Figure 1:
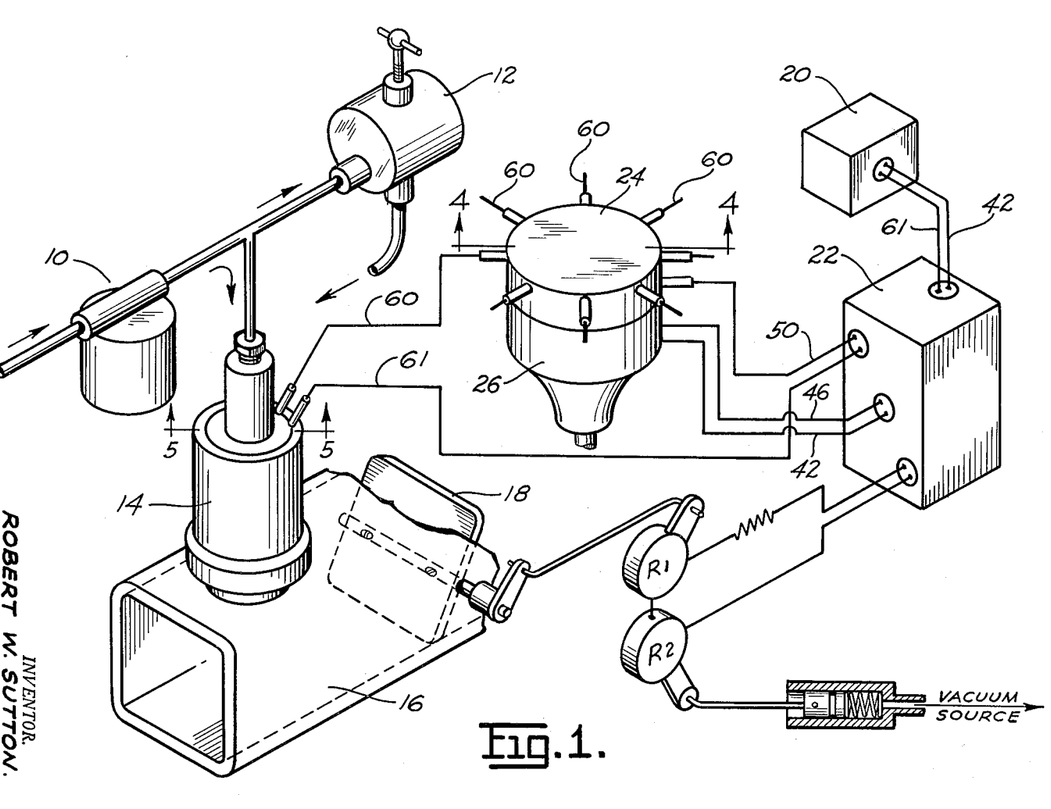
Figure 1 is a schematic view of a fuel supply system embodying the present invention.

Referring now to the drawings and more particularly to Figure 1, numeral 10 designates a pump adapted to deliver fuel under pressure from a source (not shown) to a pressure regulator 12 which controls the pressure of the fuel supplied to nozzle 14 controlled by a solenoid actuated valve. In a preferred embodiment the fuel pressure is maintained substantially constant although in other embodiments the pressure may be varied as desired. The nozzle 14 is mounted in an intake manifold 16 having a throttle valve 18 mounted therein. While the nozzle is shown as located in the intake manifold it is to be understood that the nozzle could equally as well be located to discharge directly into the cylinder of the engine downstream of the intake valve. Nozzle 14 is controlled by means comprising an electrical power supply 20, an electronic timing unit 22, a distributor 24 and an engine driven triggering device 26. The solenoid in nozzle 14 is connected to the control means by an appropriate circuit.

In operation, the engine driven triggering device triggers or energizes the electronic timing unit 22. The output of the timing unit is conducted to distributor 24 which successively connects the appropriate solenoid into the circuit in accordance with the firing order of the associated engine. The solenoids in the nozzles 14 remain energized for a period of time dependent on the time constant of the electronic timing unit 22. Appropriate means in the form of variable resistances $R_1$ and $R_2$, controlled by throttle 18 and induction passage pressure respectively, are provided to vary the time constant or time duration that the electronic timing unit remains energized. Additional resistances may be placed in the circuit to provide for temperature control, altitude control, fuel pressure changes, starting enrichment, and degassing.

Figure 2:
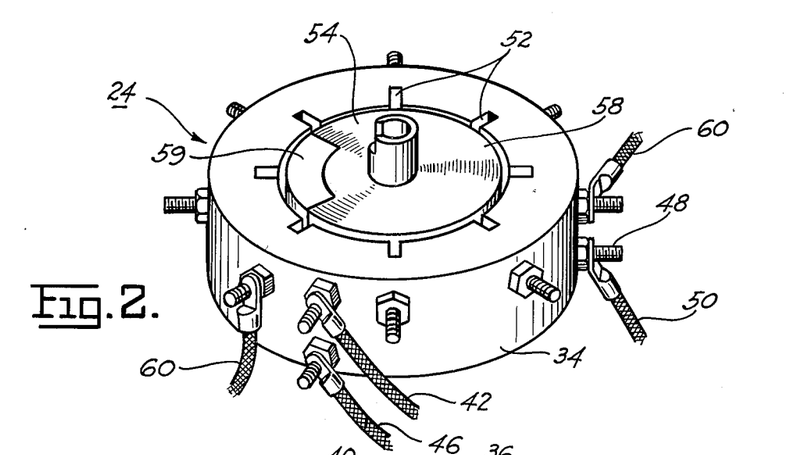
Figure 2 is a perspective view of the top portion of the distributor shown in Figure 1.
Figure 3:
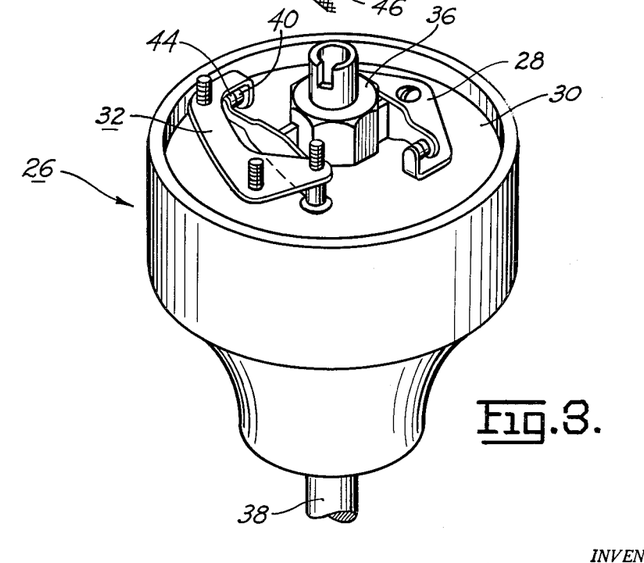
Figure 3 is a perspective view of the lower portion of the distributor shown in Figure 1.
Figure 4:
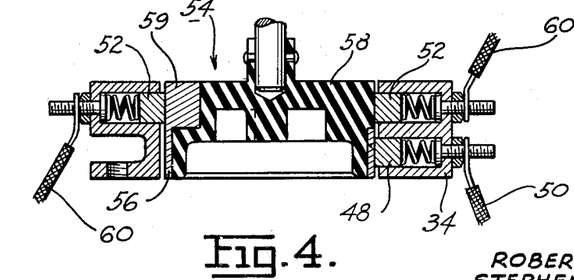
Figure 4 is a sectional view taken along line 4—4 of Figure 1.

Referring now to Figures 2, 3 and 4, the electrical fuel system distributor 24 and triggering device 26 are shown incorporated in a conventional ignition distributor housing. The conventional ignition points 28 are shown mounted on a plate 30 which is adapted to be rotated by a conventional spark advance device (not shown). Switch 32 which forms a part of triggering device 26 is mounted on a stationary contact block 34 and thus is divorced from the spark advance system. A cam 36 mounted on engine driven shaft 38 is adapted to actuate both the ignition points 28 and triggering switch 32 as a function of engine speed. The power supply 20 is connected to the stationary contact 40 by means of lead 42. The movable contact 44 of triggering switch 32 is connected by means of lead 46 to the timing unit 22.

The output of the timing unit 22 is connected to the input brush 48 by means of lead 50. Brush 48 is located in block 34 in axially spaced relation to a plurality of output brushes 52. The number of brushes 52 corresponds to the number of cylinders of the engine to which the fuel system is adapted to supply fuel. A rotor 54 is mounted on shaft 38 for rotation therewith and is formed with a conductive portion 56 and a non-conductive portion 58. The conductive portion 56 is formed so that a segment 59 only contacts brushes 52. The arcuate length of the segment is such as to be in contact with only one brush at a time. In an eight cylinder engine for example the segment may extend through 40 degrees and the brushes 52 may be spaced at 45 degree intervals. The input brush 48 engages conductive portion 56 on a plane below the stationary brushes 52. The stationary brushes 52 are connected by appropriate leads 60 to the solenoid in nozzles 14. Leads 61 are arranged to connect each of the solenoids to the ground side of the power supply 20.

Figure 5:
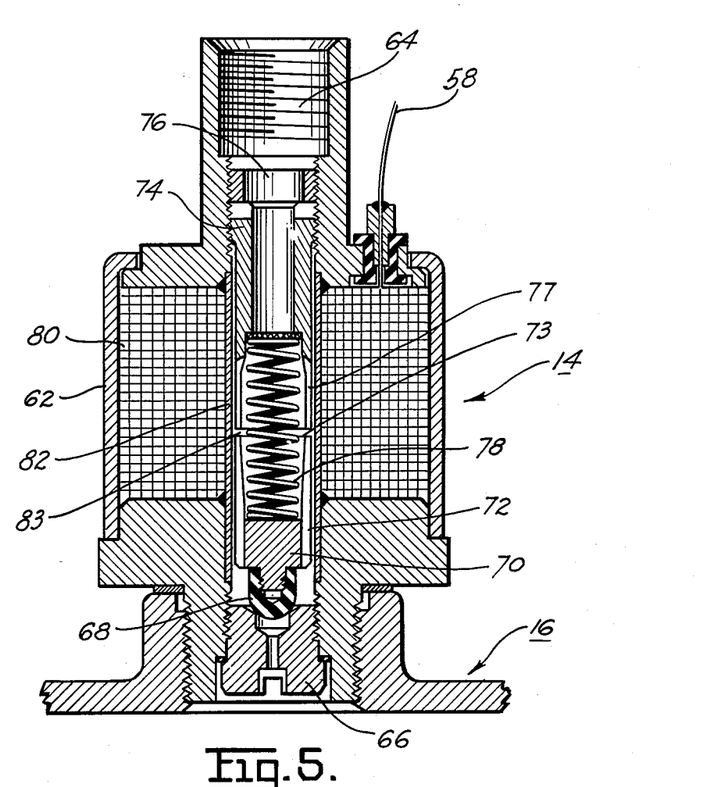
Figure 5 is a view taken along line 5—5 of Figure 1.

Each nozzle 14 as best shown in Figure 5 is provided with a body 62 formed of powdered iron. An axial conduit 64 passes through said body and is provided with a restricted metering member 66. A nylon valve 68 is adapted to seat in member 66 and control the flow therethrough. Magnetizable piston 70 is operatively connected to valve 68 and is provided with a plurality of peripherally disposed axial grooves 72. The end surface 73 of piston 70 is coated with a non-magnetic material such as chromium. A cylindrical abutment member 74 is threadedly received in conduit 64 upstream of the piston 70 and is provided with a central flow path 76 and a plurality of axially disposed peripheral grooves 77 on the downstream portion thereof. Piston 70 and member 74 are hollowed out to provide retaining means for spring 78 which is adapted to urge the piston 70 toward closed position. A solenoid 80 is located to surround a portion of a thin wall non-magnetic section 82 of conduit 64. Piston 70 is located to remain in all operative positions within section 82 and so as to be partially surrounded by the solenoid 80. The nozzle body 62 is exteriorly threaded on the discharge end so as to be secured in a complementary threaded portion of the intake manifold 16. The piston 70 and member 74 are located in such a manner that an air gap 83 is formed entirely within the non-magnetic section 82 at a point of substantially maximum flux density.

Figure 6:
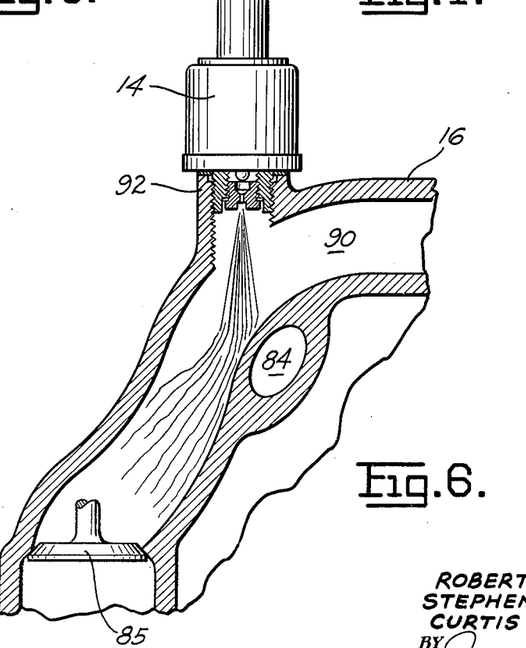
Figure 6 is a fragmentary view showing the location of a nozzle of the present invention adjacent the exhaust conduit and intake valve of an internal combustion engine.

The intake manifold 16 is adapted to lap at least a portion of the exhaust conduit 84 as best shown in Figure 6. Nozzle 14 is so located in the manifold 16 that the spray therefrom strikes a part of the manifold which laps the exhaust conduit 84 in proximity to the intake valve 85 of the engine.

Figures 7, 8:
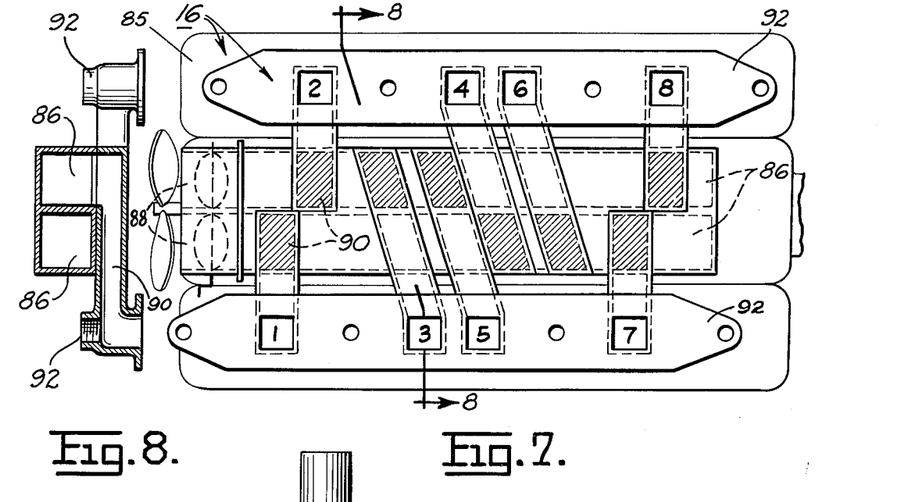
Figure 7 is a bottom view of the intake manifold and engine fragmentarily shown in Figure 1.
Figure 8 is a view taken along line 8—8 of Figure 7.

The intake manifold as best shown in Figures 7 and 8 is adapted for use on a V–8 engine 85 although it will be readily apparent to one skilled in the art that the manifold could be adapted for in-line engines or engines having varying numbers of cylinders. As shown the manifold 16 comprises a pair of horizontally disposed rectangular passages 86. The air inlets 88 for passages 86 open in the direction of vehicle forward movement to utilize the ram effect obtained during vehicle operation. The passages 86 are connected to appropriate cross passages 90 with the nozzle mounting platforms 92. Each of the passages 90 terminates at an intake valve 85.

Figure 9:
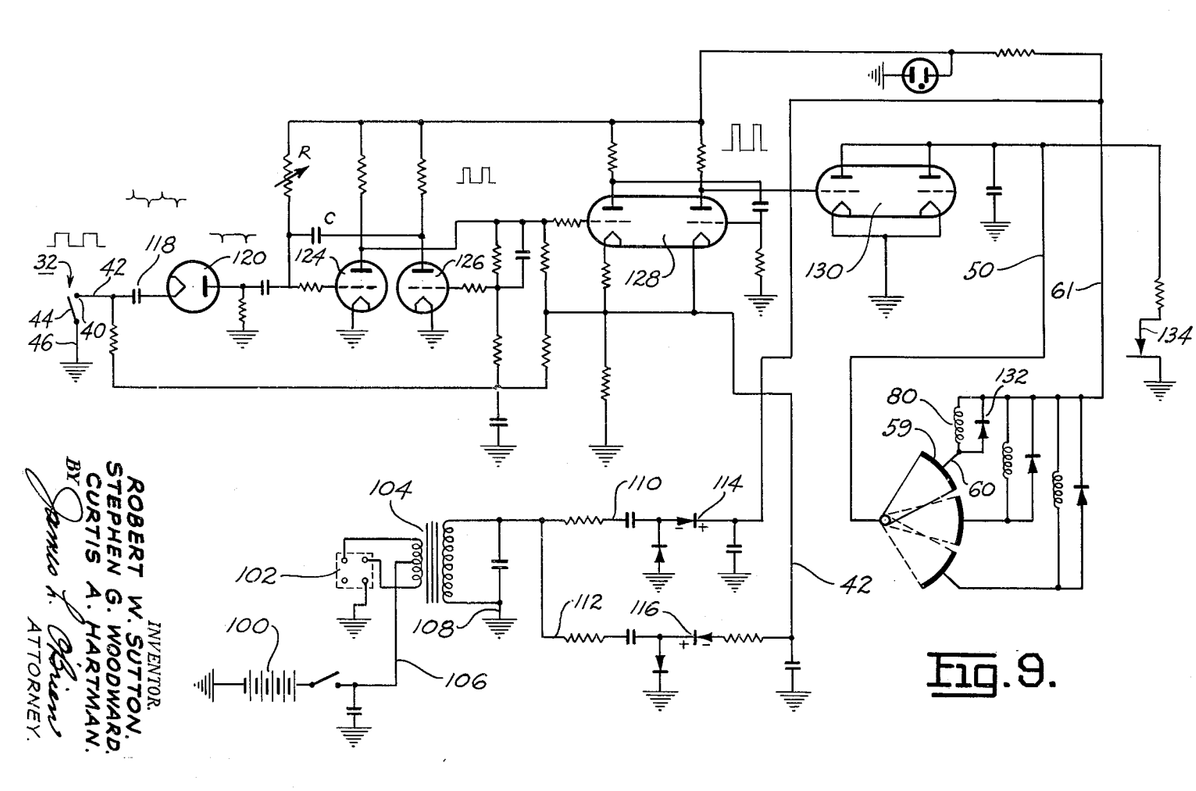
Figure 9 is a circuit diagram of the electronic timing device shown in Figure 1.

As shown in Figure 9 power supply 20 includes a battery or other source of power 100 which is connected to a non-synchronous vibrator 102 the output of which is fed into a transformer 104 the center tap of which is grounded as at 106. One side of the secondary of transformer 104 is grounded as at 108. The other side of the secondary is connected to parallel branches 110 and 112 which are provided with rectifiers or unidirectional conductive devices 114 and 116 respectively so as to provide a positive voltage in branch 110 and a negative voltage in branch 112. The branch 112 is connected to stationary contact 40 through input lead 42. Each time the movable contact 44 engages the stationary contact 40 the branch 112 is grounded through lead 46. The opening and closing of the switch 32 thus generates a series of square waves in branch 112 upstream of the condenser 118. The condenser 118 changes each of the square waves into a narrow plus and minus wave as shown in Figure 9. The output of condenser 118 is directed to the rectifier 120 where the positive voltage peaks are clipped off leaving a series of negative peaks as shown in the figure. The output of the rectifier 120 is delivered to the grid of a normally conducting first triode 124. The negative voltage peak thus delivered to the grid causes a reduction in the current flow through the first triode or in some cases causes the triode to stop conducting. When the current flow through the first triode is reduced or cut off the voltage on the grid of a second triode 126 becomes such that the second triode commences to conduct. As the second triode conducts it drives the grid of the first triode more negative to insure tube cut off. The condenser C will be charged while the second triode 126 is conducting.

When the charge on condenser C reaches a predetermined value the first triode 124 commences to conduct. As soon as the first triode conducts the second triode will be cut off. The first triode 124 will be cut off for the period of time necessary to charge condenser C to the predetermined value which time is controlled by the time constant RC. R is a variable including $R_1$ which is variable as a function of throttle movement and $R_2$ which is variable as a function of induction passage pressure. It is to be understood that C could also be varied to vary the time constant and that the remarks concerning the varying and the adding of resistance also apply to the capacitance of condenser C.

The voltage in the plate circuit of the first triode is in the form of square pulses the width of which is determined by the time constant RC. The frequency of the square pulses is determined by the frequency of actuation of switch 32. It is to be noted however that the width of the pulses is independent of the actuating frequency of switch 32. The square pulses are amplified by tube 128 prior to delivery to the power amplifier tube 130. The output of the power amplifier tube 130 is connected to the input brush 48 of the distributor 24 by means of lead 50. Current flows from the input brush 48 through conductive segment 59 and leads 60 to the solenoid 80 of the appropriate nozzle 14. A unidirectional conductive device or selenium rectifier 132 is connected across the solenoid to increase the voltage decay rate in the solenoid and also to prevent undesirable voltage surges at the time the contact between segment 59 and brush 52 opens. Solenoids 80 are connected by leads 61 with branch 114. An optional switch 134 is provided to short out the timing unit 22 to permit energization of the solenoids 80 for a time period independent of the time constant RC. The switch 134 may be connected by an appropriate linkage with a throttle 18 whereby the switch 134 may be closed upon opening movement of the throttle 18 to provide for an instantaneous increase in the time of injection so as to provide a temporary increase in the quantity of fuel supplied for acceleration purposes.

Figures 10, 11, 18, 19:
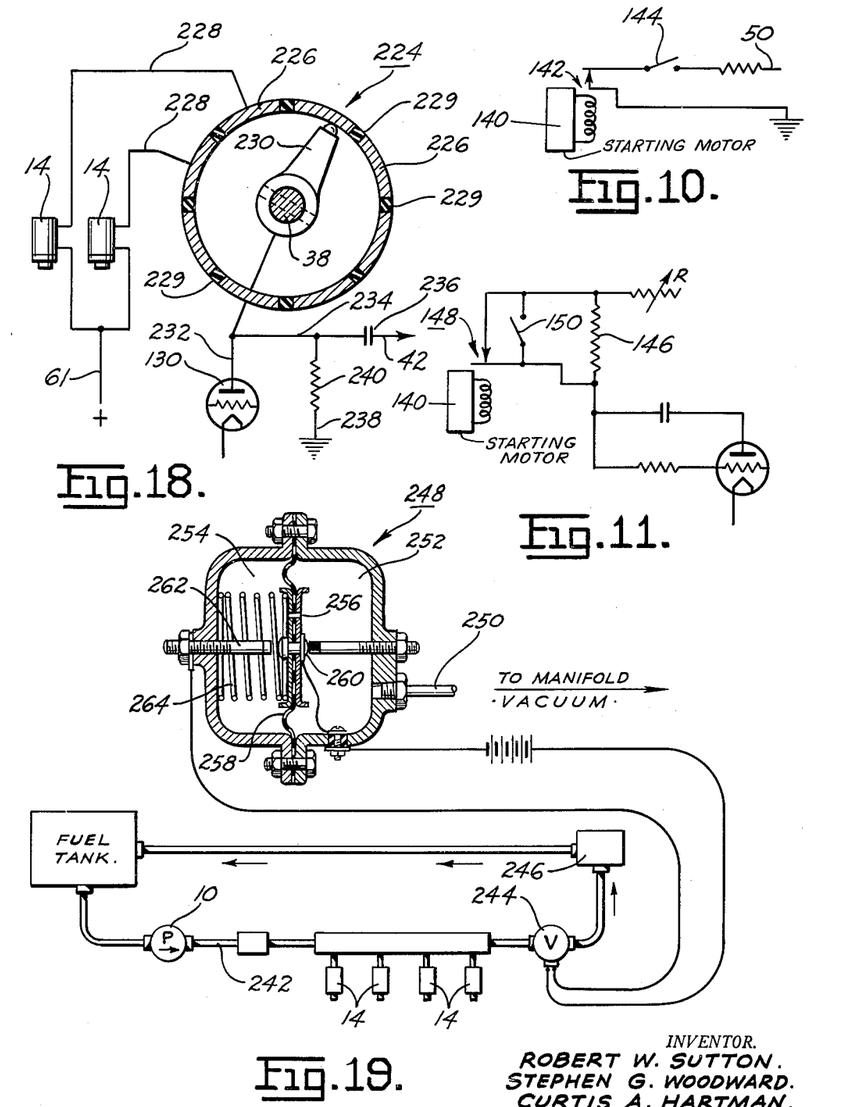
Figures 10 and 11 are starting motor circuits adapted for connection in the circuit shown in Figure 9.
Figure 18 is a modification of the distributor shown in Figures 1, 2 and 3.
Figure 19 is a modification showing additional means for regulating the pressure of the fuel supply.

Provision may also be made to short out timing unit 22 during starting to provide a temporary increase in the quantity of fuel supplied. Figure 10 shows a portion of the starting motor circuit 140 wherein a normally open relay 142 is closed when the starting motor is energized. The closing of relay 142 connects lead 50 to ground whereby the solenoids 80 will be energized during the entire time that segment 59 is in contact with a brush 52. A thermal responsive switch 144 may be inserted in the circuit so as to render the circuit ineffective under certain predetermined conditions of engine or ambient air temperature.

In Figure 11 there is shown another means for increasing the amount of fuel supplied to the engine during starting. A resistance 146 is shown connected in series with resistance R. A shunt path is provided through normally closed relay 148 so that resistance 146 normally has no effect in the circuit. Upon energization of the starting motor circuit 140, however, relay 148 opens and resistance 146 is placed in the circuit to increase the resistance in the constant circuit. A temperature responsive switch 150 may be connected in the circuit to render the relay 148 ineffective under certain conditions of engine or ambient air temperature.

Figure 12:
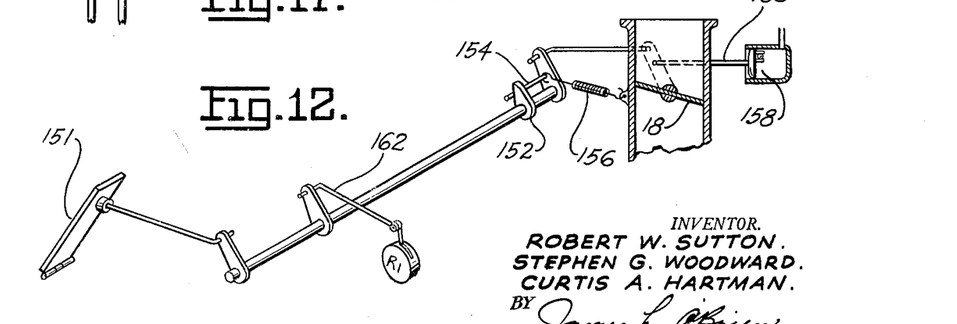
Figure 12 is a schematic view of a modification of the throttle linkage.

Instead of a direct linkage between the throttle 18 and resistance $R_1$ a linkage as best shown in Figure 12 may be provided wherein the resistance $R_1$ will be varied by movement of the accelerator pedal in advance of actual movement of the throttle. This latter arrangement compensates for the differences in inertia between the fuel and air and permits a substantially simultaneous increase of fuel flow with air flow whereby acceleration may be accomplished without delay. In Figure 12 a conventional accelerator pedal 151 is shown connected to throttle 18 through a one way connection consisting of lever 152 and rod 154. Movement of pedal 151 in a throttle opening direction moves lever 152 from engagement with rod 154 and permits spring 156 to open the throttle. The opening of the throttle lags the opening movement of pedal 151 due to the effect of dashpot 158 which is connected to throttle by means of lever 160. Resistance $R_1$ is connected directly to the accelerating pedal linkage 162 and is therefore actuated in advance of the throttle.

Figures 13, 14, 15, 16, 17:
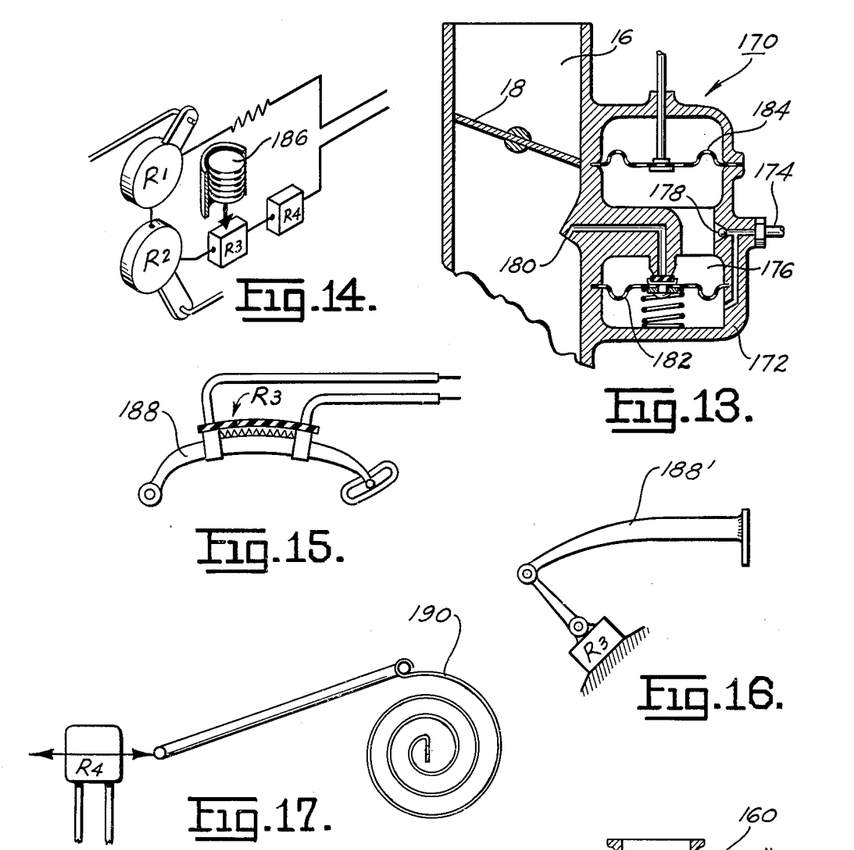
Figure 13 is an auxiliary fuel supply device for the system shown in Figure 1.
Figure 14 is a modification showing pressure and temperature responsive elements added to the control shown in Figure 1.
Figures 15 and 16 represent alternative devices for controlling the pressure element of Figure 14.
Figure 17 represents another means for controlling the temperature element of Figure 14.

In some installations on some engines it may be desirable to provide for auxiliary fuel supply means such as is shown in Figure 13, wherein a pump is shown discharging into the air intake manifold 16 downstream of the throttle 18. As shown pump 170 is provided with a housing 172 which is adapted to be connected to the outlet of pump 10 through conduit 174. Conduit 174 opens into a chamber 176 through a check valve controlled port 178. The conduit 180 which discharges into manifold 16 is closed by a spring urged diaphragm 182. A diaphragm or movable wall 184 closes one end of chamber 176 and is adapted to be actuated by the throttle through an appropriate linkage (not shown).

In some installations when degassing is desired such as when the engine is being driven by the vehicle the resistance $R_2$ may be of a non-linear type or actuable through a cam arrangement to disproportionately reduce the value of resistance when a predetermined high vacuum or low absolute pressure exists in the induction passage 16.

Somewhat similar arrangements may be made for power enrichment wherein a non-linear resistance or cam arrangement may be provided for resistance $R_2$ so that the resistance will be disproportionately increased when a predetermined low vacuum or high absolute pressure exists in the induction passage 16. A decrease in resistance $R_2$ reduces the time constant and consequently the amount of fuel supplied whereas an increase in resistance $R_2$ increases the amount of fuel supplied.

In the embodiment shown in Figure 14 the resistance R comprises $R_1$, responsive to throttle position; $R_2$, responsive to manifold pressure, $R_3$, responsive to altitude or ambient air pressure; and $R_4$ responsive to ambient air temperature. $R_3$ may be a carbon pile or rheostat variable through the action of bellows 186. $R_4$ may be a thermistor or other type of resistor which changes resistances with changes of temperature. Figures 15 and 16 show additional means for varying $R_3$ in response to changes in ambient air pressure. In Figure 15, $R_3$ is of a strain-sensitive type resistance strapped to a Bourdon tube 188. In Figure 16, $R_3$ is of a carbon pile type actuably by Bourdon tube 188'.

In Figure 17 there is shown resistance $R_4$ variable through the action of thermostat 190.

In some installations the triggering switch 32 may be eliminated and the triggering of the timing unit accomplished by the distributor. As shown in Figure 18, the distributor 224 is provided with a plurality of conductive segments 226 each of which is connected through a lead 228 with a nozzle 14. The segments 226 are separated by non-conductive sections 229. A conductive rotor 230 mounted on shaft 38 is connected to the plate of tube 130 through lead 232. Rotor 230 is also connected to input lead 42 of the timing unit 22 through lead 232 and 234 and condenser 236. Lead 234 is grounded at 238 through a relatively high resistance 240. The value of resistance 240 is selected so that the maximum current flowing through the circuit comprising lead 61, solenoid 80, lead 228, segment 226, rotor 230, leads 232 and 234, resistance 240 and ground 238 is insufficient to energize the solenoids.

In the operation of the embodiment shown in Figure 18, when rotor 230 passes from a non-conductive section 229 to engagement with a conductive segment 226 there is a sudden increase in voltage applied to condenser 236 which produces a positive voltage peak in the lead 42 which in turn may be used to trigger a timing control unit of the type shown at 22. The solenoids 80 will be energized only when tube 130 is conducting. The time duration that tube 130 will conduct is controlled by the values of RC in the control unit.

In the embodiment shown in Figure 19 means is provided for increasing the quantity of fuel supplied to the engine as upon acceleration. Pump 10 is shown supplying fuel nozzles 14 through a conduit 242. A normally open solenoid valve 244 is located in conduit 242 downstream of the nozzles 14 and upstream of pressure regulator 246. The solenoid valve is controlled by a switch 248 which is responsive to the pressure in manifold 16. Switch 248 is connected to the manifold by means of a conduit 250 which opens into a chamber 252 which in turn is connected to a chamber 254 through an orifice 256 in the movable wall 258 that separates the two chambers 252, 254. Wall 258 carries a contact 260 which is normally held out of engagement with stationary contact 262 by a spring 264. When the pressure increases in chamber 252 as upon rapid opening the throttle contact 260 will be moved into engagement with contact 262 until the pressure in chamber 254 builds up through bleed or orifice 256 to a value sufficient to permit spring 264 to open the contacts. When the contacts are closed the solenoid valve 244 is closed whereupon the pressure in conduit 242 will increase.

In some installations it may be desired to provide compensatory means for fuel pressure fluctuations to the nozzles 14. This may be accomplished by placing a pressure responsive means in the fuel conduit which may control a resistance or capacitance in R or C respectively of the control unit 22.

Figure 20:
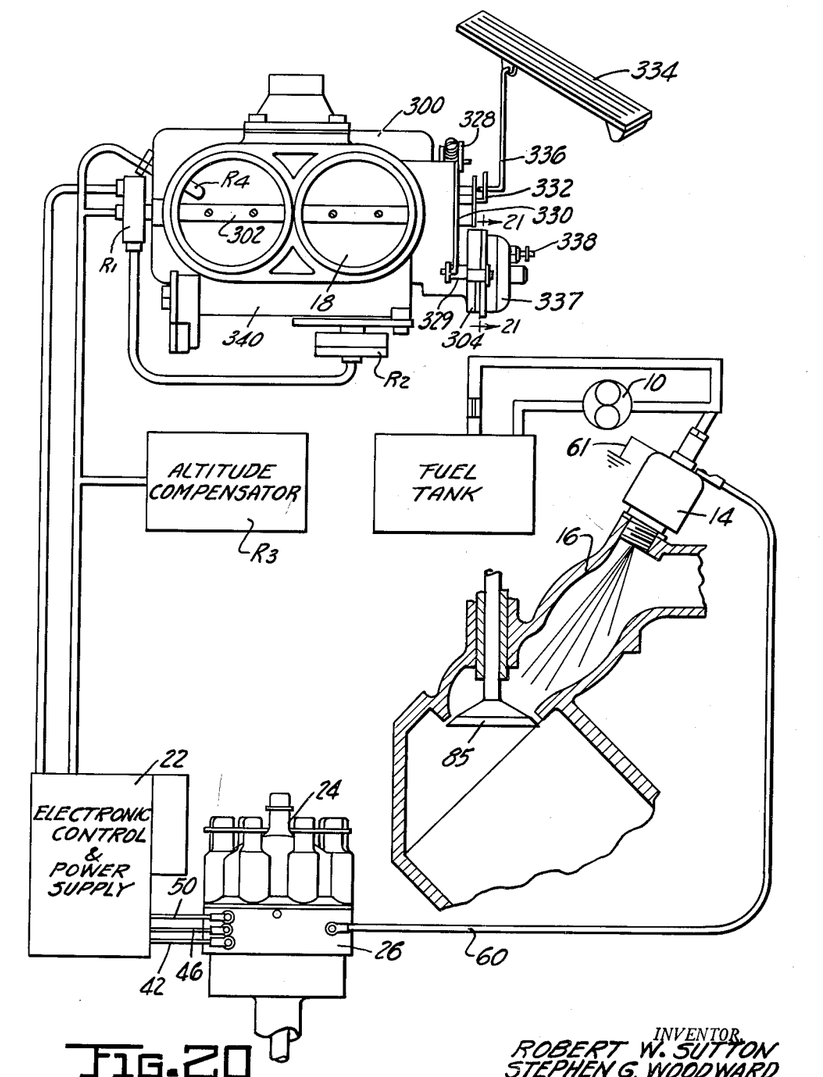
Figure 20 is a schematic view of a fuel supply system showing a starting and warm-up control.
Figure 21:
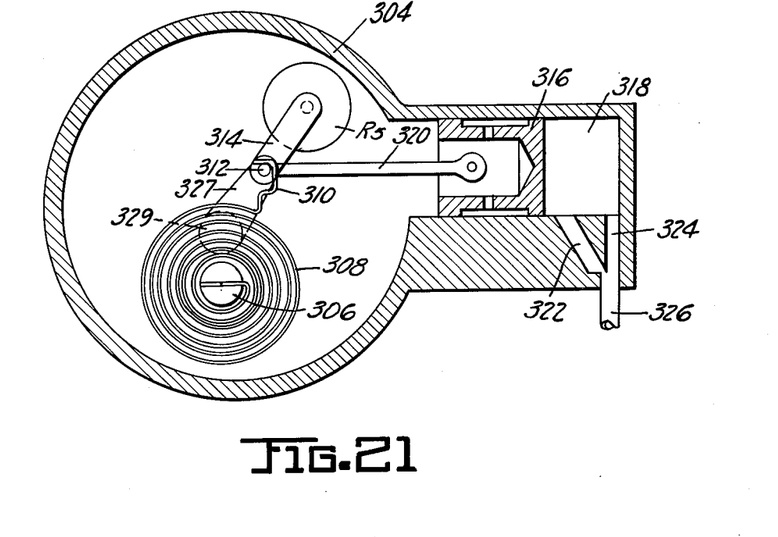
Figure 21 is an enlarged sectional view of the starting and warm-up control taken substantially along line 21—21 of Figure 20.

Referring now to the embodiment illustrated in Figure 20 there is shown a throttle body 300 with throttles 18 mounted therein on a shaft 302. A housing 304 is formed on body 300 and contains a stud 306 to which one end of a thermostat 308 is secured. The other end of thermostat 308 is hooked as at 310 for engagement with a pin 312 secured to a lever 314 which controls a potentiometer $R_5$. A piston 316 reciprocably mounted in a cylinder 318 formed in housing 304 is connected to pin 312 by means of a rod 320. One end of cylinder 318 is connected to the induction passage 16 downstream of throttle valves 18 through branch passages 322, 324 and conduit 326.

A lever 327 connected at one end to pin 312 is operatively connected to fast idle cam 328 by means including shaft 329 and rod 330. A throttle lever 332 is mounted on shaft 302 for actuation by accelerator pedal 334 through rod 336. Fast idle cam 328 is arranged to engage throttle lever 332 to limit the closing of throttles 18. Housing 304 is provided with a cover 337 which contains an electric heating coil (not shown). The coil is energized through lead 338 during at least starting and warm-up operation of the engine.

Mounted on throttle 300 are potentiometers $R_1$ and $R_2$ for actuation respectively by throttle shaft 302 and induction passage pressure responsive device 340. Potentiometer $R_3$ is mounted in an induction passage and is responsive to air temperature. Potentiometer $R_4$ may be actuated by a bellows as shown in Figure 14 and is responsive to ambient air pressure.

Potentiometers $R_1$, $R_2$, $R_3$, $R_4$ and $R_5$ are connected to electronic control 22 by appropriate wiring. The circuit of control 22 is shown schematically in Figure 9 wherein the potentiometers $R_1$, $R_2$, $R_3$, $R_4$ and $R_5$ are collectively designated R. As described previously with respect to the embodiment shown in Figure 1, control 22 is connected to triggering device 26 by leads 42 and 46 and to distributor 24 by lead 50. Nozzle 14 is connected to distributor 24 by a lead 60 and to ground potential by a lead 61.

Figure 22:
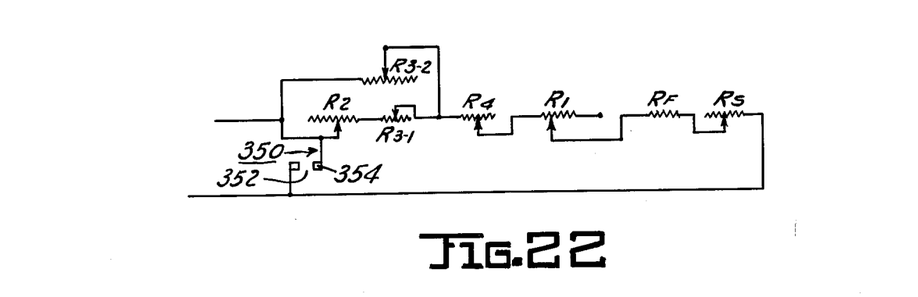
Figure 22 is a schematic view showing a modification of the elements shown in Figure 14.
Figure 23:
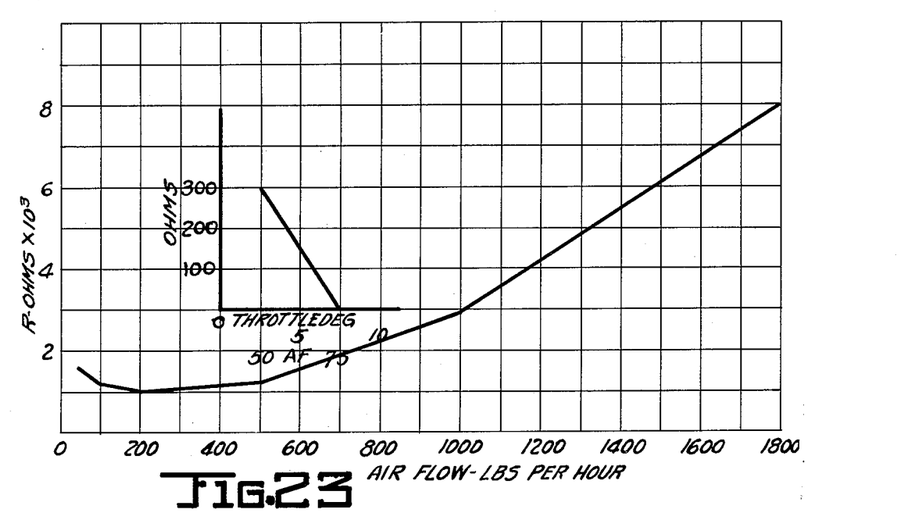
Figures 23, 24, 25 and 26 are graphs illustrating certain operating conditions of our fuel supply system.
Figure 24:
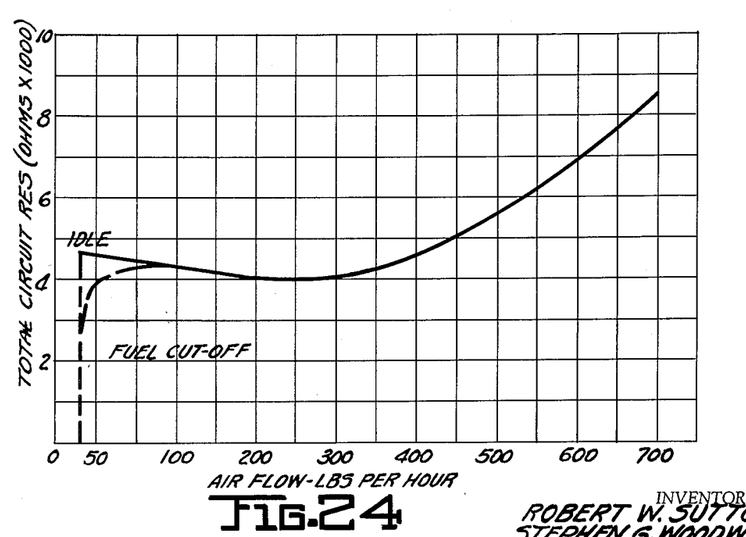

Figure 22 schematically illustrates one mode of connection of the potentiometers R in the circuit of Figure 9 wherein the fixed resistance of said circuit is designated $R_F$. Potentiometer $R_1$ is so constructed and arranged that its resistance varies from a maximum when the throttle is closed to a minimum, which may be substantial zero resistance, when the throttle has opened a few degrees such as for example 7½° as shown graphically in Figure 23. Potentiometer $R_2$ may be so constructed as to produce a non-linear change of resistance with change in air-flow or induction passage pressure as shown graphically in Figure 24. As shown in Figure 24 the resistance of $R_2$ may increase markedly at high air flows and high induction passage absolute pressures whereby the amount of fuel supplied to the engine is increased to provide power enrichment. At predetermined low air flows and low induction passage absolute pressures the resistance decreases markedly to a minimum value which may be substantially zero whereby the fuel may be reduced to provide degassing such as when the vehicle is driving the engine. In some installations wherein the sum of the resistances of $R_1$, $R_3$, $R_4$, $R_5$, and $R_F$ is significant as compared to the resistance of $R_2$ it may be desirable to reduce or cut out all or substantially all of the resistance R in the circuit of Figure 9. This may be accomplished as shown in Figure 22 by the provision of a shunt circuit 350 which is closed by a switch 352 having a contact 354 movable with or as a function of movement of the slider in potentiometer $R_2$. At a predetermined low air flow or low absolute induction passage pressure contact 354 closes switch 352 which renders circuit 350 effective to shunt the resistance R whereby the fuel supply to the engine will be substantially cut-off.

Figure 25:
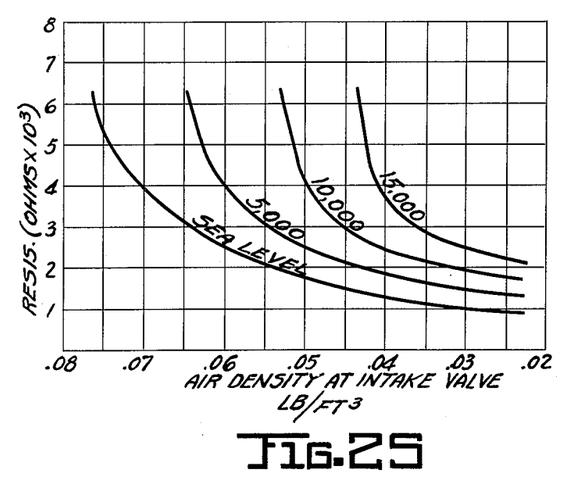
Figure 26:
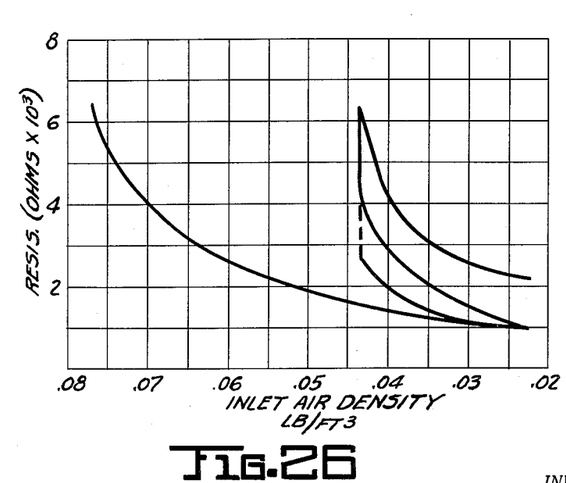

Potentiometer $R_3$ may conveniently be constructed to provide two resistances $R_{3-1}$ and $R_{3-2}$ having sliders actuable by an air pressure responsive member. Resistance $R_{3-1}$ is connected in series with $R_2$ to compensate the resistance of $R_2$ for changes in ambient air pressure in the idling range of engine operation. Resistance $R_{3-2}$ is connected in parallel with resistance $R_2$ and compensates resistance $R_2$ for changes in ambient air pressure over the range of engine operation. The effect of change of ambient air pressure, due for example to change in altitude, on resistance $R_2$ is shown graphically in Figure 25. The compensating effect of resistances $R_{3-1}$ and $R_{3-2}$ is shown graphically in Figure 26.

In operation of the device shown in Figures 20-26, the engine driven triggering device 26 triggers or energizes the electronic control 22 which remains energized for a predetermined time dependent upon the time constant of the circuit of the control.

The control 22 is connected to an appropriate nozzle 14 through distributor 24. The solenoids in nozzle 14 are energized by the control 22 to open the valve in nozzle 14 and to hold it open as long as control 22 remains emergized. When the nozzle valve is open fuel supplied by pump 10 will be delivered to the engine. The time that control 22 remains energized is dependent upon the time constant of the circuit in the control. The time constant may be varied by varying the value of resistance R which includes the resistances or potentiometers $R_1$, $R_2$, $R_3$, $R_4$ and $R_5$. The greater the resistance the longer the time constant; or increase in resistance results in an increase in the quantity of fuel supplied to the engine per energization of the control 22.

When the engine is cranked for starting and the thermostat 308 is cold the potentiometer $R_5$ will be urged toward the position of maximum resistance to provide for increased supply of fuel to the engine for starting.

After the engine has started the piston 316 will be moved toward the closed end of cylinder 318 through the reduction in induction passage pressure whereby the resistance of $R_5$ will be reduced. As the thermostat 308 warms, the hooked portion 310 thereof backs away from pin 312 thereby permitting piston 316 to move lever 314 and the slider of potentiometer $R_5$ to a position corresponding to a minimum or substantially zero resistance.

The values of the resistances $R_1$, $R_2$, $R_3$, $R_4$ and $R_5$ may be selected so as to supply the desired quantity of fuel to the engine as a function of temperature, ambient air pressure, induction passage pressure and throttle position. In some installations the resistance R may comprise less than the number of resistances above described; and in other installations may include additional resistances which may be responsive to conditions which affect engine operation.

While only one preferred embodiment of our invention with certain ramifications has been described it will be readily apparent to those skilled in the art that many changes of arrangements of parts may be made without departing from the spirit of our invention.

We claim:

1. In a fuel supply system for a multi-cylinder internal combustion engine having an induction passage, a nozzle for each of said cylinders, a valve for each of said nozzles, means for actuating each of said valves, a control device adapted to energize said means to open said valves, means operatively connected to said device and responsive to engine speed to periodically activate said device, and means operatively connected to said device for varying the time that said device remains activated independently of engine speed.

2. In a fuel supply system for a multi-cylinder internal combustion engine having an induction passage, a nozzle for each of said cylinders, a valve for each of said nozzles, means for actuating each of said valves, a control device adapted to energize said means to open said valves, means operatively connected to said device and responsive to engine speed to periodically activate said device, and means operatively connected to said device and responsive to induction passage pressure for varying the time that said device remains activated independently of engine speed.

3. In a fuel supply system for a multi-cylinder internal combustion engine having a throttle: a nozzle for each of said cylinders, a valve for each of said nozzles, means for actuating each of said valves, a control device adapted to energize said means to open said valve; means operatively connected to said device and responsive to engine speed to activate said device, means responsive to throttle position for varying the time that said device is activated independently of engine speed, and means for successively connecting said device with said first mentioned means.

4. In a fuel injection system for a multi-cylinder internal combustion engine having an induction passage and a throttle: a nozzle for each of said cylinders, a valve for each of said nozzles, means for actuating each of said valves, a control device adapted to energize said means to open said valve, means formed to activate said device periodically as a function of engine speed, means operatively connected to said device and responsive to induction passage pressure for controlling the time duration that said device is activated, means responsive to opening movement of said throttle adapted to override said last mentioned means and to control the time duration that said device is activated, and means responsive to engine speed for successively connecting said device with said first mentioned means.

5. In a fuel injection system for a multi-cylinder internal combustion engine having an induction passage and a throttle: a nozzle for each of said cylinders; a valve for each of said nozzles, means for actuating each of said valves, a control device adapted to energize said means to open said valve, means formed to activate said device periodically as a function of engine speed, means operatively connected to said device and responsive to throttle movement for controlling a time duration that said device is activated, means responsive to opening movement of said throttle adapted to override said last mentioned means and to control the time duration that said device is activated, and means responsive to engine speed for successively connecting said device with said first mentioned means.

6. In a fuel injection system for a multi-cylinder internal combustion engine having an induction passage with a throttle mounted therein: a nozzle for each of said cylinders, a valve for each of said nozzles, means for actuating each of said valves, a control device adapted to energize said means to open said valve, means operatively connected to said device and responsive to engine speed to periodically activate said device, means operatively connected to said device and responsive to throttle movement and induction passage pressure for controlling the time that said device remains activated independently of engine speed, and means responsive to engine speed for successively connecting said device with said first mentioned means.

7. In a fuel supply system for a multi-cylinder internal combustion engine having an induction passage: a nozzle for each of said cylinders, a valve in each of said nozzles, a solenoid for each of said valves energizable to open said valves, an electrical circuit for said solenoids, a switch in said circuit adapted to be periodically closed as a function of engine speed, a device in said circuit adapted to be activated when said switch is closed to control the time duration of current flow in said circuit independently of engine speed, means operatively connected to said device and responsive to induction passage pressure for varying said time duration, and a distributor driven as a function of engine speed adapted to successively connect said solenoids to said circuit.

8. In a fuel injection system for a multi-cylinder internal combustion engine having an induction passage and a throttle: a nozzle for each of said cylinders, a valve in each of said nozzles, a solenoid for each of said valves energizable to open said valve, an electrical circuit for said solenoids, a switch in said circuit adapted to be periodically closed as a function of engine speed, a device in said circuit adapted to be activated when said switch is closed to control the time duration of current flow in said circuit, means operatively connected to said device and responsive to induction passage pressure for varying said time duration, means responsive to opening movement of said throttle to override said last mentioned means and to control the time duration that said device is activated, and a distributor driven as a function of engine speed adapted to successively connect said solenoids to said circuit.

9. In a fuel injection system for a multi-cylinder internal combustion engine having an induction passage and a throttle: a nozzle for each of said cylinders, a valve in each of said nozzles, a solenoid for each of said valves energizable to open said valve, an electrical circuit for said solenoids, a switch in said circuit adapted to be periodically closed as a function of engine speed, a device in said circuit adapted to be activated when said switch is closed to control the time duration of current flow in said circuit, means operatively connected to said device and responsive to throttle movement for varying said time duration, means responsive to opening movement of said throttle adapted to by-pass said last mentioned means and to control the time duration that said device is activated, and a distributor driven as a function of engine speed adapted to successively connect said solenoids to said circuit.

10. In a fuel injection system for a multi-cylinder internal combustion engine having an induction passage and a throttle valve: a nozzle for each of said cylinders, a valve in each of said nozzles, a solenoid for each of said valves energizable to open said valve, an electrical circuit for said solenoids, a switch in said circuit adapted to be periodically closed as a function of engine speed, a device in said circuit adapted to be activated when said switch is closed to control the time duration of current flow in said circuit, means operatively connected to said device and responsive to induction passage pressure and throttle movement for varying said time duration, means responsive to opening movement of said throttle adapted to override said last mentioned means and to control the time duration that said device is activated and a distributor driven as a function of engine speed adapted to successively connect said solenoids to said circuit.

11. In a fuel supply system for a multi-cylinder internal combustion engine: a nozzle for each of said cylinders, a valve in each of said nozzles, a solenoid for each of said valves energizable to open said valves, an electrical circuit for said solenoids, a device having a variable impedance time constant in said circuit, means in said circuit responsive to engine speed adapted to periodically trigger said device, means for varying said time constant, and a distributor in said circuit adapted to successively connect said device to said solenoids for a period of time for each solenoid at least equal to said time constant.

12. A fuel injector for a multi-cylinder internal combustion engine comprising: a nozzle for each of said cylinders, a valve in each of said nozzles, a solenoid for each of said valves energizable to open said valves, an electrical circuit for said solenoid, a switch in said circuit, a shaft adapted to be driven by said engine, a cam on said shaft for intermittently actuating said switch, a rotor on said shaft, a contact on said rotor, a plurality of stationary contacts adapted to engage said rotor contact, means in said circuit connecting each of said solenoids with a separate stationary contact, a timing device in said circuit adapted to be activated by said switch, and means in said circuit connecting said timing device with said rotor contact.

13. In a fuel injector for a multi-cylinder internal combustion engine having an induction passage for an ignition system: a nozzle for each of said cylinders, a solenoid controlled valve for each of said nozzles, an electrical circuit for said solenoid, a housing, a movable plate in said housing, an ignition switch mounted on said plate and operatively connected in said ignition system, a second switch mounted in said housing, a shaft in said housing adapted to be driven by said engine, a cam on said shaft adapted to actuate said switches, a rotor on said shaft, a contact on said rotor, a plurality of stationary contacts mounted in said housing, and means in said circuit adapted to connect each of said solenoids with a separate stationary contact, a timing device in said circuit adapted to be activated by said second switch, and means in said circuit for connecting said timing device with said arcuate contact.

14. A fuel supply system for a multi-cylinder internal combustion engine having a source of fuel comprising a nozzle for each of said cylinders, conduits adapted to connect each of said nozzles with said source, means for maintaining the pressure in said conduits substantially constant, a valve in each of said conduits, means for opening said valves as a function of engine speed, variable impedance means for varying the time that said valves remain open, and means for successively connecting said last two mentioned means with said valves in accordance with the firing order of said engine.

15. A fuel supply system for a multi-cylinder internal combustion engine having an induction passage and a source of fuel comprising: a nozzle in said passage adjacent each of said cylinders, conduits adapted to connect each of said nozzles with said source of fuel, valve means for controlling the flow through each of said conduits, control means for opening said valve means, means responsive to engine speed for intermittently activating said control means, means responsive to the pressure in said passage for regulating the duration of time that said control means remains activated to hold said valve means open, and a distributor to connect said control means with said valve means in accordance with the firing order of said engine.

16. In a fuel system for a multi-cylinder internal combustion engine having an induction passage and a throttle: a nozzle in said passage adjacent each of said cylinders, a valve for each of said nozzles, electrically energizable means for actuating each of said valves, an electrical circuit for said means, a source of electrical power, a switch adapted to periodically connect said source to said circuit as a function of engine speed, a device in said circuit adapted to be actuated when said switch is closed to control the time duration of current flow in said circuit, means operatively connected to said device and responsive to induction passage pressure for varying said time duration, a switch in said circuit adapted to successively connect said electrically energizable means to said circuit and means for discharging a supplementary quantity of fuel into said passage.

17. In a fuel system for a multi-cylinder internal combustion engine having an induction passage and a throttle: a nozzle in said passage adjacent each of said cylinders, a valve for each of said nozzles, electrically energizable means for actuating each of said valves, an electrical circuit; a switch adapted to successively connect said electrically energizable means to said circuit, a source of electrical power, a switch adapted to periodically connect said source to said circuit as a function of engine speed, a device in said circuit adapted to be actuated when said switch is closed to control the time duration of current flow in said circuit, means operatively connected to said device and responsive to throttle movement for varying said time duration, and means for discharging a supplementary quantity of fuel into said passage.

18. In a fuel injection system for a multi-cylinder internal combustion engine having a source of fuel, a nozzle for each of said cylinders, conduits adapted to connect each of said nozzles with said source of fuel, valve means for controlling the flow through each of said conduits, a solenoid operatively connected to each of said valve means and energizable to open said valve means, a circuit for said solenoids, a source of power, means for intermittently connecting said solenoids with said source of power, and a unidirectional conductive device connected in said circuit in parallel with each of said solenoids.

19. In a fuel injection system for a multi-cylinder internal combustion engine having a throttle, a fuel conduit for each of said cylinders, a valve in each of said conduits, an electrically energizable device for each of said valves energizable to open said valves, a circuit for said devices, a source of electrical power connected to said circuit, a switch in said circuit, an element in said circuit adapted to pass current therethrough for a timed duration each time said switch is closed, and means in said circuit responsive to opening movement of said throttle to pass current through said circuit independent of said element.

20. In a fuel injection system for an internal combustion engine having an induction passage with a throttle mounted therein, a nozzle, a valve for said nozzle, a solenoid for said valve energizable to open said valve, an electrical circuit for said solenoid, a switch in said circuit adapted to be periodically closed as a function of engine speed, a device in said circuit adapted to be activated when said switch is closed to control the time duration of current flow in said circuit, means responsive to throttle movement for varying said time duration, means for actuating said throttle, and means actuable by said last mentioned means to actuate said first mentioned means in advance of actuation of said throttle.

21. In a fuel supply system for a multi-cylinder internal combustion engine having a starter circuit, means for supplying separate quantities of fuel to each of said cylinders, means for varying the time duration per cycle of the engine that said first means supplies fuel, and means in said circuit energizable to override said last mentioned means to control said time duration.

22. In a fuel supply system for a multi-cylinder internal combustion engine having a starting motor and a circuit therefor, a fuel conduit for each of said cylinders, a valve in each of said conduits, electrically energizable means operatively connected to said valves for controlling the time duration that said valves are open per cycle of the engine, and means operatively connected to said circuit and said first mentioned means for controlling said time duration when said circuit is energized.

23. In a fuel supply system for a multi-cylinder internal combustion engine having a starting motor, means responsive to electric current flow for supplying fuel to said cylinders, a circuit for said means, means for controlling the time duration of current flow in said circuit, elements operatively connected to said last mentioned means for varying said time duration, and means operatively connected to said starting motor and energizable therewith to vary at least one of said elements to vary said time duration.

24. In a fuel supply system for a multi-cylinder internal combustion engine, means responsive to electric current flow for supplying fuel to said cylinders, a circuit for said means, means for controlling the time duration of current flow in said circuit, and an element operatively connected to said last mentioned means and responsive to ambient air temperature for varying said time duration.

25. In a fuel supply system for a multi-cylinder internal combustion engine, means responsive to electric current flow for supplying fuel to said cylinders, a circuit for said means, means for controlling the time duration of current flow in said circuit, and an element operatively connected to said last mentioned means and responsive to ambient air pressure for varying said time duration.

26. In a fuel supply system for a multi-cylinder internal combustion engine having an induction passage, means energizable by an electric current for supplying separate charges of fuel to each of said cylinders, a circuit for said means, means for energizing said circuit for a timed duration for each cycle of the engine, and elements operatively connected to said last mentioned means and responsive to induction passage pressure and ambient air temperature respectively for varying the time of said timed duration.

27. In a fuel supply system for a multi-cylinder internal combustion engine having an induction passage, means energizable by an electric current for supplying separate charges of fuel to each of said cylinders, a circuit for said means, means for energizing said circuit for a timed duration for each cycle of the engine, and an element operatively connected to said last mentioned means and responsive to engine temperature for varying the time of said timed duration.

28. In a fuel supply system for a multi-cylinder internal combustion engine having an induction passage, with a throttle therein, means energizable by an electric current for supplying separate charges of fuel to each of said cylinders, a circuit for said means, means for energizing said circuit for a timed duration for each cycle of the engine, and elements operatively connected to said last mentioned means and responsive to induction passage pressure, throttle movement, ambient air temperature and ambient air pressure respectively for varying the time of said timed duration.

29. In a fuel supply system for a multi-cylinder internal combustion engine having an induction passage, means energizable by an electric current for supplying fuel to each of the cylinders of said engine, a circuit for said means, means for energizing said circuit for a timed duration, resistance and capacitance elements in said circuit for controlling said timed duration, and means operatively connected to at least one of said elements and responsive to a predetermined low absolute induction passage pressure for reducing said timed duration to a predetermined low value.

30. In a fuel supply system for a multi-cylinder internal combustion engine having a source of electrical energy, a circuit adapted for connection to said source, means connected to said circuit and energizable by an electric current for supplying fuel to the cylinders of said engine, a switch in said circuit, a timing device in said circuit adapted to pass current only while said device is energized, means responsive to the closing of said switch for producing a pulse of electrical energy to energize said device and impedance means operatively connected to said device for varying the time that said device remains energized.

31. In a fuel supply system for a multi-cylinder internal combustion engine, a fuel conduit for each of said nozzles, a valve in each of said conduits, a solenoid for each of said valves energizable to open said valves, a source of power, a circuit connected to said source, a timing device in said circuit adapted to pass current only while said device is energized, a stationary contact for each of said solenoids, a movable contact connected to said circuit and adapted to successively engage said stationary contacts, and means in said circuit for producing a pulse of energy to energize said device when said movable and stationary contacts come into engagement.

32. In an electric control for a fuel supply system having a source of power, a plurality of power circuits, a device connected to said source and adapted to pass current only when energized, a triggering circuit adapted to periodically energize said device, and a distributor switch adapted to successively connect said device to said power circuits and to connect said triggering circuit to said source of power whereby said triggering circuit becomes effective to energize said device.

33. In a fuel supply system for a multi-cylinder internal combustion engine having an induction passage and a source of fuel, a conduit for each of said cylinders connected to said source, means for controlling the time duration of fuel flow through said conduits per cycle of the engine, means for maintaining the fuel pressure in said conduits substantially constant and means responsive to induction passage pressure for varying the pressure in said conduits from said substantially constant pressure.

34. In a fuel supply system internal combustion engine having a source of fuel and an induction passage with a throttle therein, a conduit connecting said source with said engine, a valve in said conduit for controlling the flow therethrough, electrical means for actuating said valve, a circuit for said means, a device in said circuit for controlling the time duration of current flow in said circuit, a thermostat operatively connected to said device to increase said time duration, and means responsive to induction passage pressure posterior to said throttle to oppose the action of said thermostat.

35. A fuel injecting apparatus for an internal combustion engine having a cylinder, an intake port for the cylinder and an inlet valve related to the port including, an air intake manifold having an inlet opening, a throttle valve related to the inlet opening in the manifold and controlling the flow of air to the port, an electrically operated fuel injector unit related to the intake port, means supplying fuel to the unit, electric distributing means timed with the engine and adapted to energze and actuate the unit for a time duration controlled independently of engine speed each time the inlet valve is opened, and manually operable control means extending between and controlling the unit and the throttle valve.

36. A fuel injecting apparatus for an internal combustion engine having a plurality of cylinders, an intake port for each cylinder and an inlet valve related to each port including, an air intake manifold having an inlet opening and a plurality of ducts communicating with the inlet ports of the engine, a throttle valve related to the manifold and controlling the flow of air to the ports, an electrically operated fuel injector unit related to each intake port, means supplying fuel to the several units, electric distributing means timed with the engine and adapted to energize and actuate the units for a time duration controlled independently of engine speed each time the inlet valves related thereto are opened, and manually operable control means extending between and controlling the several units and the throttle valve.

37. A fuel injecting apparatus for an internal combustion engine having a plurality of cylinders, an intake port for each cylinder and an inlet valve related to each port including, an air intake manifold having an inlet opening and a plurality of ducts communicating with the ports, a throttle valve related to the inlet opening in the manifold and controlling the flow of air to the ports, an electrically operated fuel injector unit with a metering valve related to each duct and adapted to inject fuel into the intake port related thereto, means supplying fuel to the several units, electric distributing means timed with the engine and adapted to energize and actuate the units for a time duration controlled independently of engine speed each time the inlet valves related thereto are opened, and manually operable control means extending between and controlling the metering valves of the several units and the throttle valve.

38. In a fuel supply system for an internal combustion engine having an indiction passage and a source of fuel, a conduit adapted to connect said source to said passage, a valve in said conduit, a solenoid for said valve energizable to open said valve, an electrical circuit for said solenoid, a device having a variable impedance time constant in said circuit for controlling a time duration of current flow therein and means responsive to a predetermined induction passage pressure operatively connected to said device for reducing the time constant to substantially zero whereby said valve will remain in closed position and the fuel supply to the engine will be cut off.

39. A fuel injection system for an internal combustion engine having an induction system for charging said cylinders, said injection system comprising a source of fuel under pressure, a plurality of nozzles interconnected with said source for injecting said fuel into the charges for said cylinders, a solenoid actuated valve in each of said nozzles for controlling the volume of fuel discharged from each nozzle, a pressure sensitive device responsive to the vacuum in said induction system, electrical means operatively interconnected with said pressure sensitive means and adapted to produce an electrical signal in proportion to the fuel demands of said engine, a distributor for sequentially interconnecting said electrical means with the individual solenoid actuated valves whereby said signal will individually retain said valves open in proportion to the amount of said fuel demands.

(References on following page)

References Cited in the file of this patent

UNITED STATES PATENTS

| | | |
|---|---|---|
| 1,323,778 | Lemp | Dec. 2, 1919 |
| 1,627,727 | Charter | May 10, 1927 |
| 1,664,612 | French | Apr. 3, 1928 |
| 1,803,666 | French | May 5, 1931 |
| 2,332,909 | Fuscaldo | Oct. 26, 1943 |
| 2,442,399 | Chandler | June 1, 1948 |
| 2,448,131 | Williams et al. | Aug. 31, 1948 |
| 2,487,774 | Schipper | Nov. 8, 1949 |
| 2,511,213 | Leslie | June 13, 1950 |

FOREIGN PATENTS

| | | |
|---|---|---|
| 971,274 | France | July 5, 1950 |